United States Patent [19]
Gerwin

[11] Patent Number: 5,332,349
[45] Date of Patent: Jul. 26, 1994

[54] FLUSH RIVET WITH COMPOUND RADIUS DOMED HEAD

[76] Inventor: Jon R. Gerwin, 5449 Abbeyfield, Long Beach, Calif. 90815

[21] Appl. No.: 109,091

[22] Filed: Aug. 19, 1993

[51] Int. Cl.$^5$ ............................................ F16B 19/06
[52] U.S. Cl. ................................... 411/507; 411/504; 29/525.2
[58] Field of Search ............... 411/500, 501, 504, 506, 411/507; 29/509, 524.1, 525.2

[56] References Cited

U.S. PATENT DOCUMENTS

| | | | |
|---|---|---|---|
| 3,526,032 | 9/1970 | Pipher | 29/509 |
| 3,927,458 | 12/1975 | Speakman | 29/407 |
| 3,936,205 | 2/1976 | Speakman | 403/279 |
| 4,000,680 | 1/1977 | Briles . | |
| 4,004,484 | 1/1977 | Speakman | 411/507 |
| 4,051,592 | 10/1977 | Briles | 411/507 X |
| 4,086,839 | 5/1978 | Briles | 411/507 |
| 4,159,666 | 7/1979 | Briles . | |
| 4,230,016 | 10/1980 | Merrell . | |
| 4,425,067 | 1/1984 | Krezak | 411/500 |
| 4,493,141 | 1/1985 | Krezak | 29/509 |
| 4,609,315 | 9/1986 | Briles | 411/43 |
| 4,695,213 | 9/1987 | Sparling et al. | 411/506 |
| 4,712,958 | 12/1987 | Sparling et al. | 411/506 |
| 5,026,234 | 6/1991 | Luhm | 411/507 |

Primary Examiner—Neill R. Wilson
Attorney, Agent, or Firm—Klein & Szekeres

[57] ABSTRACT

A flush rivet is configured for joining first and second overlapping structural members together, wherein the structural members define a bore comprising a cylindrical main bore, a cylindrical counterbore and a frustoconical intermediate bore between the counterbore and the main bore. The rivet includes a cylindrical shank dimensioned to be received the main bore, and having a distal end formed as a tail portion that projects distally from the main bore. The proximal end of the shank terminates in a head that includes a cylindrical section having a diameter that is slightly less than the diameter of the cylindrical counterbore, and a frustoconical section, between the shank and the cylindrical section, configured to seat in the intermediate bore. An end face on the proximal end of the head includes a central region having a first radius of curvature that is between 9 and 25 times the shank diameter, and a peripheral region having a second radius of curvature that is less than the first radius of curvature. Upon being installed in the bore, the rivet deforms in the following sequence: (1) the radial expansion of the shank so as to fill the main bore; (2) the substantially simultaneous (a) upsetting of the tail against the second structural member, and (b) deformation of the frustoconical head section to seat tightly against the surface of the intermediate bore; and (3) the radial expansion of the cylindrical head section to provide an interference fit between the cylindrical head section and the interior surface of the cylindrical counterbore.

20 Claims, 2 Drawing Sheets

FLUSH RIVET WITH COMPOUND RADIUS DOMED HEAD

BACKGROUND OF THE INVENTION

This invention relates generally to the field of rivets. More specifically, it relates to an improved type of countersunk flush rivet, of the kind having a domed or crown head.

Countersunk flush rivets are well known in the art, as represented by the following U.S. Pat Nos.: 3,526,032—Pipher; 3,927,458—Speakman; 3,936,205—Speakman; 4,000,680—Briles; 4,004,484—Speakman; 4,051,592—Briles; 4,086,839—Briles; 4,159,666—Briles; 4,425,067—Krezak; 4,493,141—Krezak; 4,712,958—Sparling et. al; and 5,026,234—Luhm.

There are a number of considerations in the design of flush rivets. Specifically, the rivet head, when installed, must expand to fill the countersunk hole completely and intimately seal against the surrounding workpiece surface. This is especially true when the riveted workpieces are the plates or sheets of a fuel storage tank or the like. Also, the rivet must provide the required degree of clamping force to secure the riveted workpieces together, and to maintain the clamping force without working loose as a result of the vibration, agitation or flexing of the workpiece. A related consideration is the achievement of optimum joint strength and fatigue resistance through controlled rivet deformation, during installation, to achieve the proper relationship between axial clamping forces and radial expansion to fill the rivet hole. Furthermore, the rivet head, when installed, must be as flush as possible along its own surface. This is especially true with rivets installed in aerodynamic surfaces for high performance aircraft, where any surface irregularity can degrade performance, due to the aerodynamic drag.

In the past, one approach to achieving as close to a flush fit as possible has been to optimize the design of the head, as exemplified by the above-referenced prior art patents, and then to "shave" off any irregularities in the head/workpiece interface and any excess rivet head material after the rivet has been installed. This shaving process is time consuming, costly and imperfect, in terms of being non-uniform. Thus, some rivets, even after being shaved, may protrude more than the others from the surrounding surface (due to, for example, non-uniform hole expansion during rivet installation), while some rivets, installed in countersinks that are somewhat shallower than the normal depth, may have too much of the heads removed, resulting in less than the desired degree of rivet strength and integrity. This latter defect may be especially troublesome, since visual inspection will not normally reveal a shaved rivet installed in a shallower than normal countersink.

While prior art flush rivets, such as those described in the above-referenced patents, have achieved various degrees of success in meeting the criteria discussed above, further improvements are constantly being sought, especially in ways that provide significant measures of cost savings. Thus, for example, it is a design criterion to eliminate, as much as possible, the "footprint" of the installed head; that is, any interruption, irregularity or discontinuity in the head surface itself, or in the head/workpiece interface. Prior art rivet designs that have sought to minimize this footprint have done so by compromising, to varying extents, the optimum metal flow during deformation to achieve the proper relationship between axial clamping and radial hole filling.

SUMMARY OF THE INVENTION

Broadly, the present invention is a countersunk flush rivet with a compound radius domed head, wherein the dome of the head is defined by a convexly curved end face that extends radially outwardly, with two distinct radii of curvature, to the periphery of a cylindrical section of the head. The cylindrical section of the head has a diameter slightly less than the diameter of a cylindrical counterbore in which the head seats, thereby providing clearance therebetween prior to setting, and thus tightly engaging the cylindrical counterbore in the workpiece when the rivet is set. The configuration of the domed head allows the rivet head to undergo optimum expansion (in terms of achieving the proper relationship between axial clamping forces and radial hole filling) when set, while leaving no significant "footprint", and (nearly always) without the need to shave the head and thus compromising the desired strength and fatigue resistance for the set rivet.

The rivet of the present invention is designed for joining two or more structural members together, with aligned apertures in the members defining a continuous main bore and a countersink bore, the latter comprising a cylindrical counterbore and a frustoconical intermediate bore which tapers between the cylindrical counterbore and the main bore. The rivet has an external configuration that substantially conforms to the main bore, cylindrical counterbore and frustoconical intermediate bore.

Specifically, the rivet has a cylindrical shank conforming to the main bore, with a tail end that projects beyond the main bore and that is adapted to be upset. On the opposite end of the shank is a head having a domed end face or crown with a compound radius of curvature, a cylindrical section, and frustoconical section having an angle of taper that is slightly greater than the angle of taper of the intermediate bore. The crown has a central portion that has a primary radius of convex curvature of at least 9 times the shank diameter and not more than 25 times the shank diameter, and a peripheral portion, concentrically surrounding the central portion, that has a measurably smaller radius of convex curvature between the central crown portion and the juncture of the end face with the cylindrical section of the head. The diameter of the central curved portion is optimally at least about 90 per cent of the diameter of the shank, and no more than about 90 per cent of the diameter of the cylindrical head section.

When the rivet is set, the head in the countersink bore is flattened and radially expanded to become substantially flush with the workpiece surface, while the conical and frusto-conical portions become tightly pressed against, and have a continuous surface in pressure relationship with, the countersink bore. More specifically, the head configuration provides a metal flow of the rivet, during installation, in which the shank first expands radially to fill the main bore, then the clamping of the workpiece between the upset shank tail and the frustoconical head section is achieved. Finally, the countersink bore is filled by the radial expansion of the cylindrical and frustoconical head sections, thereby inducing additional skin sheet cold work, and thus yielding improved fatigue resistance over prior art flush rivets.

It is, therefore, an object of the invention to provide a flush rivet that is simple in design and durable in construction, and that can be manufactured by low cost techniques from a variety of materials, such as common aluminum and titanium alloys.

It is another object of the invention to provide a flush rivet that substantially eliminates the "footprint" of the installed head, i.e., any interruption, irregularity or discontinuity in the head surface itself or in the head/workpiece interface, and that eliminates or minimizes the need for rivet head shaving after driving.

It is a further object of the invention to provide a rivet that yields an improved fatigue life for the structural members through which the rivet extends, without distortion of the structural members, such as aircraft skin and stringer elements.

It is still a further object to provide a rivet that creates an improved seal with the required degree of clamping force, and that maintains the clamping force without working loose, so as to prevent liquid passage when employed, for example, in aircraft fuel tank panels.

These and other objects and advantages of the present invention will be better appreciated and understood from the following detailed description of a preferred embodiment of the invention.

DETAILED DESCRIPTION OF THE PREFERRED EMBODIMENT

Figure 1:
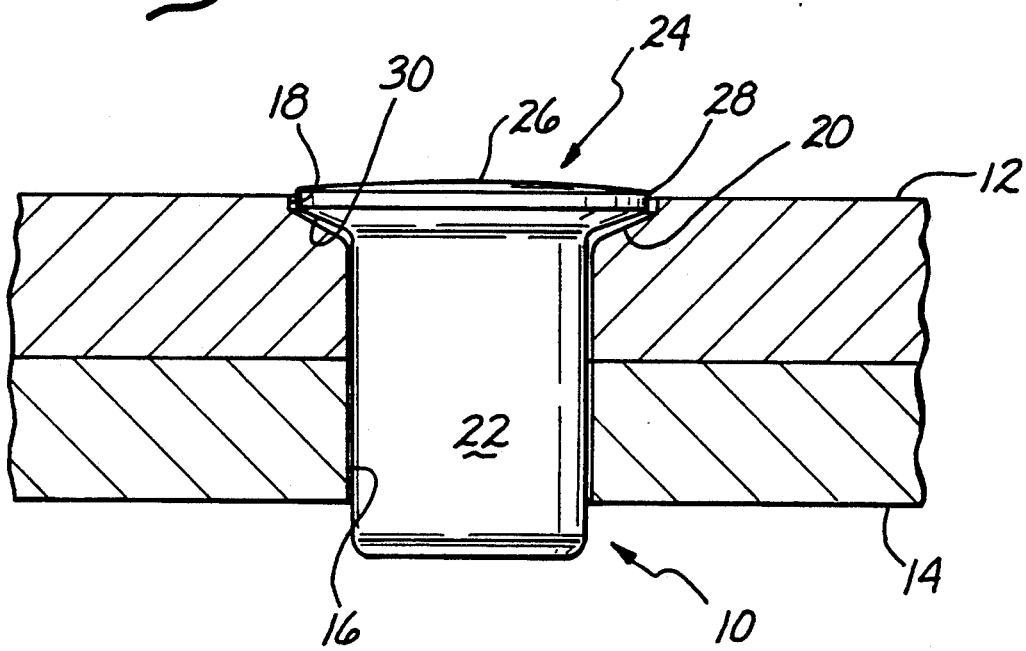
FIG. 1 is an elevational view of a rivet, in accordance with a preferred embodiment of the present invention, inserted in a pair of overlapping structural panels or workpieces, shown in cross section, prior to the formation of a joint between the workpieces.

Referring to the drawings, wherein like or similar parts are designated by the same numerals throughout the various figures, a rivet 10, in accordance with the preferred embodiment of the present invention, is illustrated in its undeformed or unset state (i.e., before being driven) in FIG. 1. The rivet 10 is installed through first and second relatively thin, overlapping workpiece panels or sheets 12, 14, which may be the outer skin of an aircraft and a stringer, respectively. The workpiece panels 12, 14 have coaxially aligned apertures that define a main bore 16 through both workpiece panels, and a countersink bore, in the first (outer or proximal) panel 12, the latter comprising a cylindrical counterbore 18 and a frustoconical intermediate bore 20 which tapers between the cylindrical counterbore 18 and the main bore 16. All three bores have a common forwardly extending axis.

Figure 3:
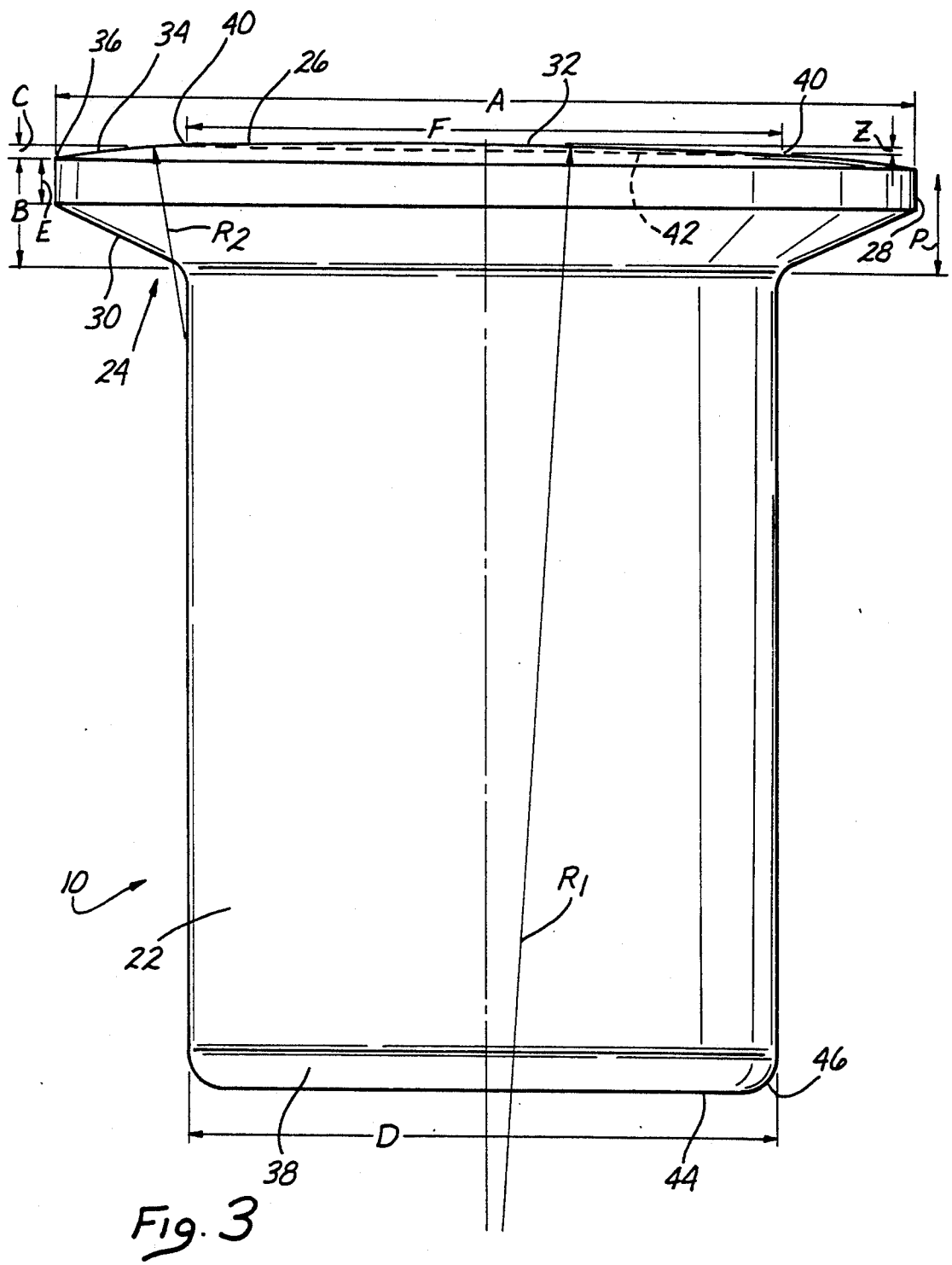
FIG. 3 is an elevational view of the rivet showing the dimensional relationships of rivet elements.

The rivet 10 comprises a cylindrical shank 22, of constant diameter D, the proximal end of which is contiguous with an integral head 24. The head 24 has a domed end face or crown 26 that terminates a generally cylindrical section 28, which is joined to the shank 22 by a frustoconical section 30. The crown 26 extends proximally from the cylindrical section 28 of the head, with a compound radius of curvature. More specifically, as best shown in FIG. 3, the crown 26 is defined by a central convexly curved region 32 and a concentric peripheral convexly curved region 34. The central curved region 32 is a convex dome with a face diameter F, curving upwardly from a proximal edge 36 of the cylindrical head section 28 by a distance equal to sum of the dimensions Z and C, shown in FIG. 3, with a first radius of curvature $R_1$. The peripheral curved region 34 extends from the radially outer edge of the central curved region 32 to the proximal edge 36 of the cylindrical head section 28, with a second radius of curvature $R_2$ that is less than the first radius of curvature $R_1$. Thus, the total head diameter A, corresponding to the diameter of the cylindrical section 28, comprises the sum of the central curved region diameter F plus the radial width of the peripheral curved region 34. The transition from the first radius of curvature $R_1$ to the second radius of curvature $R_2$ is gradual, rather than abrupt, so that the peripheral curved region 34 merges smoothly with the central curved region 32, with no surface discontinuities on the end face.

The depth of the workpiece cylindrical counterbore 18 and the axial length of the rivet head cylindrical section 28 (the dimension E in FIG. 3) are approximately equal, and, in the preferred embodiment, measure at least 0.012". The diameter of the cylindrical counterbore 18 is preferably slightly greater than the diameter A of the cylindrical head section 28, to provide a clearance therebetween. The total axial dimension (depth) of the countersink bore (the cylindrical counterbore 18 plus the frustoconical intermediate bore 20) is approximately equal to the axial length of the cylindrical head section 28 plus the frustoconical head section 30, shown as the dimension B in FIG. 3. The obtuse taper angle of the frustoconical head section 30 is preferably slightly greater than the obtuse countersink angle, namely, the taper angle of the frustoconical intermediate bore 20. For example, in the preferred embodiment, the taper angle of the frustoconical head section 30 is about 122°, while the countersink angle is about 120°.

Figure 2:
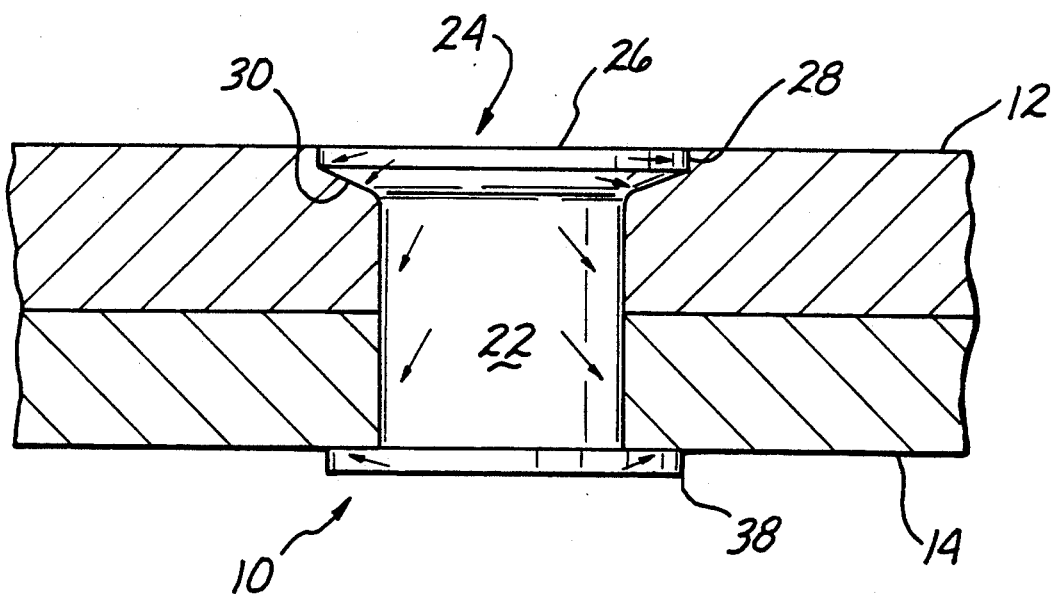
FIG. 2 is a view similar to that of FIG. 1, showing the rivet after its deformation to form the joint between the workpieces.

If the rivet head 24 is shallow with respect to the thickness of the outer workpiece panel 12 (i.e., the dimension B is significantly smaller than the panel's thickness), excellent fatigue resisting qualities can be obtained without distorting even a thin outer panel. The amount of material in the domed head 24 is such that, when flattened (as described below), and with the head 24 thereby radially expanded, the end face 26 will be substantially flush with the surrounding surface of the outer workpiece panel 12. Before flattening, however, the end face 26 protrudes sufficiently so that the surface of the outer panel 12 will not normally be struck when the rivet is driven during its installation, The general method of installation of the rivet 10 is conventional: A driver (not shown) is applied to the end face of the head 24, and an anvil (not shown) is applied to the distal end of the shank 22 that protrudes from the distal end of the main bore 16. As shown in FIG. 2, the distal end of the shank 22 is thereby deformed ("upset") to form a tail portion 38 that is tightly in abutment against the inner workpiece panel 14. Throughout this process, the frustoconical head portion 30 remains seated against the surface of the frustoconical intermediate bore 20, to stop the axial travel of the rivet while it is being driven. The rivet head 24 is deformed by the driver and flattened to fill in the small clearance existing between the cylindrical head section 28 and the cylindrical counterbore 18. A portion of the material from the domed end face or crown 26 flows in a direction that is generally perpendicular to the workpiece panel's surface. Other flow components are in the radially outward direction, from the central region 32 of the crown 26, so that depressions, recesses, and holes in the surface of the countersink bore 18, 20 are completely filled with the deformable rivet material. The additional material in the head 24 also fills any gap or space which may initially exist between the end face 26 and the workpiece surface, in the event that the improper manufacturing tolerances cause the rivet to set deeper within the countersink bore than is desirable, thereby providing a truly flush surface when the rivet is in its driven state.

More specifically, and still referring to FIG. 2, when the rivet is driven, the end face or crown 26 is flattened, as discussed above, the material thereof being pushed downward into the cylindrical head section 28 and into the shank 22. The shank then radially expands to fill the main bore 16. The compression of the rivet head 24 continues until the diameter of the head area in contact with the driver reaches the diameter D of the shank 22. At that time, the upset of the tail 38 begins, while the expansion of the rivet head 24 continues. The upsetting of the tail 38 against the inner panel 14, and the simultaneous deformation of the frustoconical head section 30 to seat tightly in abutment against the surface of the frustoconical intermediate bore section 20, provide the axial clamping force that forms a high strength joint between the panels 12, 14. Finally, the cylindrical head section 28 is expanded radially to fill the gap between the cylindrical head section 28 and the cylindrical counterbore 18 to provide a strong interference fit between the interior surface of the cylindrical counterbore 18 and the cylindrical head section 28. This interference fit will be sufficiently intimate (if the rivet is properly driven) to create a fluid-tight seal, thereby making the rivet of the instant invention especially advantageous in the fabrication of aircraft fuel tanks and the like.

After the cylindrical head section 28 has been fully expanded radially, the entire end face or crown 26 is sufficiently flattened and flush with the surrounding surface of the outer workpiece panel 12, so as not to require any shaving to be acceptable from an aerodynamic drag standpoint. Moreover, there is no significant "footprint" evident in the installed rivet, in terms of irregularities, interruptions, or discontinuities in the end face surface, or in the end face/workpiece panel surface interface.

Rivet dimensions for the preferred embodiment, before rivet installation, are optimized and presented in the table shown in FIG. 4. The letters along the top row of the table are keyed to the letters that designate dimensions shown in FIG. 3. All dimensions are presented in decimal parts of an inch. The dimensional tolerances are ±0.005, unless otherwise specified. Rivets made with the dimensions shown in the table, when installed in properly dimensioned bores, will (a) seal the gap between the cylindrical counterbore 18 and the cylindrical head section 28; (b) fill the countersink bore voids and irregularities; and (c) appropriately prestress the countersink bore surface during installation to achieve an optimum clamping force that maintains good joint integrity in the face of workpiece vibration, agitation, and/or flexing.

The values shown in the following table reflect certain dimensional relationships of the preferred embodiment.

| D +.002 −.001 | A ±.001 | B | C | E MIN | F ±.010 | P | $R_1$ | $R_2$ | Z |
|---|---|---|---|---|---|---|---|---|---|
| .125 | .161 | .027 | .006 ±.0015 | .014 | .120 | .0202–.0222 | 1.250 | .190 | .0025 |
| .156 | .209 | .035 | .007 ±.0015 | .017 | .150 | .0247–.0269 | 1.520 | .250 | .0021 |
| .187 | .257 | .044 | .0075 ±.0015 | .021 | .190 | .0265–.0288 | 1.910 | .312 | .0025 |
| .222 | .311 | .053 | .008 ±.0015 | .024 | .224 | .0387–.0410 | 2.350 | .350 | .0026 |
| .250 | .357 | .061 | .0085 ±.002 | .027 | .254 | .0443–.0470 | 2.600 | .375 | .0029 |
| .283 | .404 | .069 | .009 ±.002 | .030 | .285 | .0532–.0558 | 2.920 | .400 | .0035 |
| .310 | .453 | .077 | .0095 ±.002 | .033 | .318 | .0434–.0464 | 3.250 | .415 | .0037 |

As shown in the above table, the diameter F of the central curved region 32 of the crown 26 is preferably approximately equal to the shank diameter D, the central crown diameter F ranging from about 90% to about 110% of the shank diameter D. Furthermore, the central curved region diameter F should not be more than about 90 per cent of the cylindrical head section diameter A. The curved regions 32, 34 of the end face or crown 26, with the dual radii of curvature, blend together in defining the surface of the crown 26, the central region diameter F defining a circumference 40 approximately mid-way in the transition between the first and second radii of curvature $R_1$, $R_2$. The central curved region 32 protrudes proximally a distance Z from a horizontal plane 42 passing through the crown 26 so as to intersect the circumference 40. As previously mentioned, the first radius of curvature $R_1$ must be at least about 9 times, and not more than about 25 times, as large as the shank diameter D. These ratios have been found to give excellent results in producing a rivet with an axial dimension (height) that is substantially less than the conventional buttonhead rivet.

The peripheral curved region 34 is preferably a full 360° annulus circumferentially surrounding the central curved region 32, although it may circumscribe as little as about 340° of the surface of the crown 26. The peripheral curved region 34 extends radially outwardly to the proximal peripheral edge 36 of the cylindrical head section 28, having the diameter A. The axial dimension E of the cylindrical head section 28 must be at least 0.012″, as previously mentioned. The distal end of the shank 22, which forms the tail 38, has a flat circular central surface 44, with a radiused peripheral edge 46.

The rivet 10 can be manufactured from any suitable material. For example, a number of common aluminum alloys, such as 2017, 2117, 5056, and 7050, would yield acceptable results, as would several titanium alloys, such as 45Cb. Material identification symbols can be formed on the distal end of the shank 22 by conventional methods.

While the particular configuration shown and described herein is directed to a particular preferred embodiment, it is understood that those skilled in art may conceive modifications and/or variations to the specific embodiment described herein. Any such modification and/or variation would, therefore, fall within the purview of this description and is intended to be included herein. It is understood that the description herein is intended to be illustrative only and is not intended to be limitative.

What is claimed is:

1. A flush rivet, for joining first and second overlapping structural members together, the structural members defining a bore comprising a cylindrical main bore, a cylindrical counterbore and a frustoconical intermediate bore between the cylindrical counterbore and the main bore, the rivet comprising:

a cylindrical shank, having a constant shank diameter, radially dimensioned to be received in the main bore, and having a proximal end and a distal end, the distal end formed as a tail portion that projects distally from the main bore and that is configured and positioned to be upset against the second structural member; and a head integral and contiguous with the proximal end of the shank, the head comprising a cylindrical section having a diameter that is slightly less than the diameter of the cylindrical counterbore, a frustoconical section between the shank and the cylindrical section, the frustoconical head section being configured to seat in the intermediate bore, and an end face on the proximal end of the head;

wherein the end face comprises a central convexly-curved region having a first radius of curvature and a peripheral convexly-curved region concentrically surrounding the central convexly-curved region and having a second radius of curvature that is less than the first radius of curvature, the first radius of curvature being at least about 9 times the shank diameter and no more than about 25 times the shank diameter.

2. The rivet of claim 1, wherein the cylindrical section has an axial dimension that is about the same as, but not substantially less than, the axial dimension of the cylindrical counterbore.

3. The rivet of claim 1, wherein the central convexly-curved region has a diameter that is about 90 per cent to about 110 per cent of the shank diameter.

4. The rivet of claim 3, wherein the diameter of the central convexly-curved region is not more than about 90 per cent of the diameter of the cylindrical head section.

5. The rivet of claim 1, wherein the transition, on the end face, between the central convexly-curved region and the peripheral convexly-curved region forms a smooth, non-discontinuous end face surface.

6. The rivet of claim 1, wherein the frustoconical head section has an obtuse taper angle, and the intermediate bore has an obtuse countersink angle that is slightly smaller than the taper angle.

7. The rivet of claim 1, wherein the rivet is configured so that, upon being installed in the bore, the rivet deforms in a sequence comprising:

(1) the radial expansion of the shank so as to fill the main bore;
(2) the substantially simultaneous (a) upsetting of the tail against the second structural member, and (b) deformation of the frustoconical head section to seat tightly in abutment against the surface of the intermediate bore; and
(3) the radial expansion of the cylindrical head section to provide an interference fit between the cylindrical head section and the interior surface of the cylindrical counterbore.

8. A flush rivet, for joining first and second overlapping structural members together, the structural members defining a bore comprising a cylindrical main bore, a cylindrical counterbore and a frustoconical intermediate bore between the cylindrical counterbore and the main bore, the rivet comprising:

a cylindrical shank, having a constant shank diameter, radially dimensioned to be received in the main bore, and having a proximal end and a distal end, the distal end formed as a tail portion that projects distally from the main bore and that is configured and positioned to be upset against the second structural member; and a head integral and contiguous with the proximal end of the shank, the head comprising a cylindrical section having a diameter that is slightly less than the diameter of the cylindrical counterbore, a frustoconical section between the shank and the cylindrical section, the frustoconical head section being configured to seat in the intermediate bore, and an end face on the proximal end of the head;

wherein the end face comprises a central convexly-curved region having a first radius of curvature and a peripheral convexly-curved region concentrically surrounding the central convexly-curved region and having a second radius of curvature that is less than the first radius of curvature; and wherein the configuration of the head and the shank are such that, upon being installed in the bore, the rivet deforms in a sequence comprising:

(1) the radial expansion of the shank so as to fill the main bore;
(2) the substantially simultaneous (a) upsetting of the tail against the second structural member, and (b) deformation of the frustoconical head section to seat tightly in abutment against the surface of the intermediate bore; and
(3) the radial expansion of the cylindrical head section to provide an interference fit between the cylindrical head section and the interior surface of the cylindrical counterbore.

9. The rivet of claim 8, wherein the first radius of curvature is at least about 9 times the shank diameter and no more than about 25 times the shank diameter.

10. The rivet of claim 8, wherein the cylindrical section has an axial dimension that is about the same as, but not substantially less than, the axial dimension of the cylindrical counterbore.

11. The rivet of claim 8, wherein the central convexly-curved region has a diameter that is about 90 per cent to about 110 per cent of the shank diameter.

12. The rivet of claim 11, wherein the diameter of the central convexly-curved region is not more than about 90 per cent of the diameter of the cylindrical head section.

13. The rivet of claim 8, wherein the transition, on the end face, between the central convexly-curved region and the peripheral convexly-curved region forms a smooth, non-discontinuous end face surface.

14. The rivet of claim 8, wherein the frustoconical head section has an obtuse taper angle, and the intermediate bore has an obtuse countersink angle that is slightly smaller than the taper angle.

15. A method of joining first and second overlapping structural members with a rivet, wherein the structural members are coaxially apertured so as to define a bore comprising a cylindrical main bore through the first and second structural members, a cylindrical counterbore in the first structural member, and a frustoconical intermediate bore in the first structural member between the cylindrical counterbore and the main bore, the method comprising the steps of:

(1) providing a rivet comprising a cylindrical shank, having a constant shank diameter, radially dimensioned to be received in the main bore, and having a proximal end and a distal end, the distal end formed as a tail portion that is dimensioned to project distally from the main bore and that is configured and positioned to be upset against the second structural member, the head being integral and contiguous with the proximal end of the shank, the head comprising a cylindrical section having a diameter that is slightly less than the diameter of the cylindrical counterbore, a frustoconical section between the shank and the cylindrical section, the frustoconical head section being configured to seat in the intermediate bore, and an end face on the proximal end of the head, the end face comprising a central convexly-curved region having a first radius of curvature and a peripheral convexly-curved region concentrically surrounding the central convexly-curved region and having a second radius of curvature that is less than the first radius of curvature;

(2) inserting the rivet into the bore so that the tail projects distally from the main bore through the second structural member, and the end face of the head projects proximally from the cylindrical bore section;

(3) applying a driver to the end face and an anvil to the tail so as to deform the rivet therebetween, whereby the deformation occurs in a sequence comprising the steps of:

(a) expanding the shank radially so as to fill the main bore;

(b) substantially simultaneously (i) upsetting the tail against the second structural member, and (ii) deforming the frustoconical head section to seat tightly in abutment against the surface of the intermediate bore; and (c) expanding the cylindrical head section radially to provide an interference fit between the cylindrical head section and the interior surface of the cylindrical counterbore.

16. The method of claim 15, wherein the first structural member has a surface surrounding the cylindrical counterbore, and wherein the sequence of rivet deformation further comprises the step of:

(d) flattening the end face of the rivet head until it is substantially flush with the surrounding surface of the first structural member.

17. The method of claim 15, wherein the first radius of curvature is at least about 9 times the shank diameter and no more than about 25 times the shank diameter.

18. The method of claim 15, wherein the cylindrical head section has an axial dimension that is about the same as, but not substantially less than, the axial dimension of the cylindrical counterbore.

19. The method of claim 15, wherein the central convexly-curved region has a diameter that is about 90 per cent to about 110 per cent of the shank diameter.

20. The method of claim 19, wherein the diameter of the central convexly-curved region is not more than about 90 per cent of the diameter of the cylindrical head section.

* * * * *